(12) United States Patent
Gentry et al.

(10) Patent No.: US 10,936,703 B2
(45) Date of Patent: Mar. 2, 2021

(54) OBFUSCATING PROGRAMS USING MATRIX TENSOR PRODUCTS

(71) Applicant: INTERNATIONAL BUSINESS MACHINES CORPORATION, Armonk, NY (US)

(72) Inventors: Craig Broadwell Gentry, Yorktown Heights, NY (US); Charanjit Singh Jutla, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 16/053,534

(22) Filed: Aug. 2, 2018

(65) Prior Publication Data
US 2020/0042676 A1     Feb. 6, 2020

(51) Int. Cl.
G06F 21/14 (2013.01)
G06F 17/16 (2006.01)
G06F 8/41 (2018.01)

(52) U.S. Cl.
CPC .............. G06F 21/14 (2013.01); G06F 8/41 (2013.01); G06F 17/16 (2013.01)

(58) Field of Classification Search
CPC ............ G06F 21/14; G06F 8/41; G06F 17/16
USPC .......................................................... 726/26
See application file for complete search history.

(56) References Cited

U.S. PATENT DOCUMENTS

| | | | |
|---|---|---|---|
| 8,814,691 B2 | 8/2014 | Haddick et al. | |
| 9,176,473 B1* | 11/2015 | Lieberman | G03H 1/0276 |
| 9,548,860 B2* | 1/2017 | Zhang | H04L 9/0852 |
| 9,946,853 B1 | 4/2018 | Chirhart et al. | |
| 9,946,895 B1 | 4/2018 | Kruse et al. | |
| 10,289,816 B1* | 5/2019 | Malassenet | G06F 9/30036 |
| 10,635,739 B1* | 4/2020 | Batruni | G06F 17/14 |
| 2005/0058285 A1* | 3/2005 | Stein | H04L 9/0631 380/29 |
| 2008/0071559 A1 | 3/2008 | Arrasvuori | |
| 2011/0276563 A1* | 11/2011 | Sandoval | G06F 21/6245 707/723 |

(Continued)

OTHER PUBLICATIONS

Tensor-matrix products with a compressed spare tensor Shaden Smith, George Karypis IA3 '15: proceedings of the 5th Workshop on Irregular Applications: Architecture and Algorithms. Nov. 2015, Article No. 5, 1-7. (Year: 2015).*

(Continued)

*Primary Examiner* — Noura Zoubair
*Assistant Examiner* — Mohammad S Shams
(74) *Attorney, Agent, or Firm* — F. Chau & Associates, LLC

(57) ABSTRACT

A method for compiling a matrix-product program into an obfuscated-matrix-product program includes receiving a plurality of matrices that form the matrix-product program, randomly generating a set of independent and invertible tensor-product matrices, randomly generating a set of independent and invertible linear-transform matrices, and generating a dynamic-fence-generation gadget by processing at least one of the plurality of matrices, the set of tensor-product matrices and the set of linear-transform matrices. The dynamic-fence-generation gadget is an obfuscated version of computer program represented by the plurality of matrices.

14 Claims, 11 Drawing Sheets

(56) References Cited

U.S. PATENT DOCUMENTS

| | | | |
|---|---|---|---|
| 2012/0198302 A1* | 8/2012 | Otterstedt | H03M 13/2906 |
| | | | 714/755 |
| 2013/0147837 A1 | 6/2013 | Stroila | |
| 2014/0171039 A1 | 6/2014 | Bjontegard | |
| 2014/0181171 A1* | 6/2014 | Dourbal | G06F 17/16 |
| | | | 708/607 |
| 2014/0223147 A1* | 8/2014 | Chamon | G06F 17/16 |
| | | | 712/223 |
| 2015/0365229 A1* | 12/2015 | Patey | H04L 9/0869 |
| | | | 380/30 |
| 2017/0091240 A1* | 3/2017 | Yu | G06F 16/3331 |
| 2017/0118016 A1* | 4/2017 | Shibutani | H04L 9/0861 |
| 2017/0256096 A1 | 9/2017 | Faaborg et al. | |
| 2017/0257649 A1* | 9/2017 | Bourouihiya | H04N 21/2347 |
| 2018/0269941 A1* | 9/2018 | Faxer | H04B 7/0456 |

OTHER PUBLICATIONS

Level 3 basic linear algebra subprograms for spare matrices: a user-level interface Lain S. Duff, Michele Marrone, Giuseppe Radicati, Carlo Vittoli ACM Transactions on Mathematical Software (TOMS), vol. 23, Issue 3. Sep. 1997, pp. 379-401 (Year: 1997).*

List decoding tensor products and interleaved codes Parikshit Gopalan, Venkatesan Guruswami, Prasad Raghavendra StOC '09: Proceedings of the forth-first annual ACM symposium on Theory of computing. May 2009, pp. 13-22 (Year: 2009).*

* cited by examiner $$\text{vec} \begin{pmatrix} 2 & 6 \\ 8 & 1 \end{pmatrix} = \begin{pmatrix} 2 \\ 6 \\ 8 \\ 1 \end{pmatrix} \quad \leftarrow 301$$

$$\text{mat} \begin{pmatrix} 2 \\ 6 \\ 8 \\ 1 \end{pmatrix} = \begin{pmatrix} 2 & 6 \\ 8 & 1 \end{pmatrix} \quad \leftarrow 302$$

FIG. 3

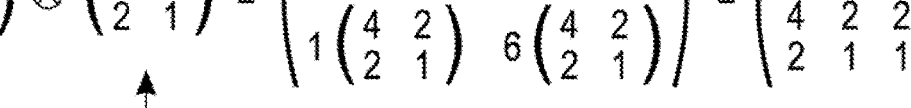

$$(A \otimes B) \times \text{vec } M = \text{vec}(A \times M \times B^T) \quad \leftarrow 501$$

$$\begin{pmatrix} 8 & 4 & 28 & 14 \\ 4 & 2 & 14 & 7 \\ 4 & 2 & 24 & 12 \\ 2 & 1 & 12 & 6 \end{pmatrix} \times \begin{pmatrix} 2 \\ 6 \\ 8 \\ 1 \end{pmatrix} = \text{vec}\left( \begin{pmatrix} 2 & 7 \\ 1 & 6 \end{pmatrix} \times \begin{pmatrix} 2 & 6 \\ 8 & 1 \end{pmatrix} \times \begin{pmatrix} 4 & 2 \\ 2 & 1 \end{pmatrix} \right) \quad \leftarrow 502$$

FIG. 5

$$\underline{801}$$
$$F_{i,b,j} \times (G_{i,j,z} \otimes H_{i,j,z}) \times F^{-1}_{i,b,j+1}$$

FIG. 13

$\vec{x} = \begin{pmatrix} x_1 \\ \vdots \\ x_3 \end{pmatrix}$ ← 1301

$\begin{pmatrix} x_1 \\ \vdots \\ x_3 \end{pmatrix} \otimes \begin{pmatrix} x_1 \\ \vdots \\ x_3 \end{pmatrix} = \begin{pmatrix} x_1 \begin{pmatrix} x_1 \\ \vdots \\ x_3 \end{pmatrix} \cdots x_3 \begin{pmatrix} x_1 \\ \vdots \\ x_3 \end{pmatrix} \end{pmatrix} = \begin{pmatrix} x_1x_1 \\ x_1x_2 \\ x_1x_3 \\ x_1x_2 \\ x_2x_2 \\ x_2x_3 \\ x_1x_3 \\ x_2x_3 \\ x_3x_3 \end{pmatrix}$ ← 1302

$Mon^2(\vec{x}) = \begin{pmatrix} x_1x_1 \\ x_1x_2 \\ x_1x_3 \\ x_2x_2 \\ x_2x_3 \\ x_3x_3 \end{pmatrix}$ ← 1303

OBFUSCATING PROGRAMS USING MATRIX TENSOR PRODUCTS

GOVERNMENT LICENSE RIGHTS

This invention was made with government support under contract number W911NF-15-C-0236 awarded by the Defense Advanced Research Projects Agency (DARPA). The government has certain rights in the invention.

TECHNICAL FIELD

Embodiments of the present disclosure are directed to methods and systems for transforming or compiling a computer program or circuit into an equivalent obfuscated version of the program or circuit. The obfuscated version is considered secure if it is computationally hard to recover the original program or any of its secrets by reverse engineering the obfuscated program.

DISCUSSION OF THE RELATED ART

Obfuscation is the deliberate act of creating software that is difficult for humans to understand, by using, e.g., needlessly roundabout expressions to compose statements. Programmers may deliberately obfuscate code to conceal its purpose or the logic or implicit values embedded in it, to prevent tampering and reverse engineering, or as a puzzle or recreational challenge. Automated code obfuscation can help protect trade secrets contained within the software by making reverse-engineering a program by decompiling an executable or library difficult and economically unfeasible. Obfuscating source code can also help protect licensing mechanisms and unauthorized access, and can shrink the size of the executable.

There are two classes of obfuscations of programs known in the prior art. The first class relates to heuristic methods of obfuscating the program by adding redundant steps, renaming variables to be incomprehensible, etc. While, this class of obfuscation is enough to hide the details of the program from a casual reader, automated tools can be built into reverse engineer or "de-compile" the obfuscated program. The second class of obfuscation of programs are built using tools commonly used in cryptography, i.e. using some computationally hard algorithm, or at least a hard problem for which no easy solution is known, such as the factorization of product of large primes. However, the only known such obfuscation technique uses a cryptographic method called the hard multilinear map, which in turn is built on a well-known hard problem of "learning with errors" or more generically referred to as noisy encodings. However, this solution is very inefficient as the parameters required to make re-engineering or de-compilation the obfuscation hard tend to be very large because of the "noisy encodings".

There are also some other ad hoc methods known which claim to obfuscate securely, however all such techniques are known to be susceptible to reverse engineering attacks.

SUMMARY

Embodiments of the present disclosure can provide a secure and efficient obfuscation method for computer circuits and programs.

Embodiments of the present disclosure can provide a set of instructions for running an obfuscated program on a standard computer.

According to an embodiment of the disclosure, there is provided a method for compiling a matrix-product program into an obfuscated-matrix-product program. The method includes the steps of receiving a plurality of matrices that form the matrix-product program, randomly generating a set of independent and invertible tensor-product matrices, randomly generating a set of independent and invertible linear-transform matrices, and generating a dynamic-fence-generation gadget by processing at least one of the plurality of matrices, the set, of tensor-product matrices and the set of linear-transform matrices. The dynamic-fence-generation gadget is an obfuscated version of computer program represented by the plurality of matrices.

According to a further embodiment of the disclosure, each of the tensor-product matrices are over a finite field.

According to a further embodiment of the disclosure, each of the tensor-product matrices are over integers modulo a prime number.

According to a further embodiment of the disclosure, the dynamic-fence-generation gadget includes a plurality of step-gadgets wherein each of the plurality of matrices is associated with one of the plurality of step-gadgets.

According to a further embodiment of the disclosure, processing the at least one of the plurality of matrices comprises a plurality of processing sub-steps wherein each sub-step processes one of the plurality of matrices to produce said step-gadget.

According to a further embodiment of the disclosure, the step-gadget is a quadratic function of its input and embedded within the quadratic function is the one of the plurality of matrices.

According to a further embodiment of the disclosure, the step gadget is a matrix $S_{i,b}$ defined as $S_{i,b}=\mathrm{mat}\{F_{i,b,1}^{-1} \times T_{i,b,x} \times F_{i,b,m+1} \times (F_{i,b,1}^{-1} \times T_{i,b,x} \times F_{i,b,m+1})^T \times \mathrm{vec}\ C_{i,b}\}$, wherein $i=1$ to $n$, $m<n$, $b=0$ or $1$, $S_{i,b}$ is a t×t matrix, $t \geq 2$, C is one of the plurality of matrices that form the matrix-product program, F is one of the set of linear-transform matrices, $T_{i,b,x}=\Pi_{j=1,m} F_{i,b,j} \times (G_{i,j,z} \otimes H_{i,j,z}) \times F_{i,b,j+1}^{-1}$ is a $t^2 \times t^2$ matrix, $G_{i,j,z} \otimes H_{i,j,z}$ is one of the set of tensor-product matrices, and $z=x[j]$ wherein x is an input bit string of length m, wherein $x[j]=0$ or $1$ for $j=1$ to m.

According to a further embodiment of the disclosure, the method includes computing a plurality of matrices $T_{i,b,x}$ for different inputs x and a matrix $S_{i,b}$ for each of the plurality of matrices $T_{i,b,x}$, generating a matrix M from a subsequence of $\mathrm{Mon}^2(\mathrm{vec}(T_{i,b,x}))$ for each of the plurality of matrices $T_{i,b,x}$, generating a matrix N by vectorizing each matrix $S_{i,b}$ and forming a matrix from the vectors $\mathrm{vec}(S_{i,b})$, and generating an obfuscated program $\mathrm{OP}=\mathrm{mat}\{V*\mathrm{Mon}^2(\mathrm{vec}(X))_{top}\}$. $V=N*M^{-1}$ and $\mathrm{Mon}^2(\mathrm{vec}(X))_{top}$ is a top subsequence of $\mathrm{Mon}^2(\mathrm{vec}(X))$, wherein X is a new variable and OP is an obfuscation of a program represented by X.

According to a further embodiment of the disclosure, generating a dynamic-fence-generation gadget further comprises combining the set of linear-transform matrices and the set of tensor-product matrices.

According to a further embodiment of the disclosure, combining the set of linear-transform matrices and the set of tensor-product matrices includes selecting one of the set of tensor-product matrices and one of the set of linear-transform matrices, and applying the selected linear-transform matrix to a vectorization of the selected tensor-product matrix.

According to an embodiment of the disclosure, there is provided a method for executing an obfuscated-matrix product program on an input bit string. The method includes the steps of receiving an input bit-string, selecting a subset of a set of matrices of a matrix-product program using at least one bit of the input bit-suing, processing the subset of matrices into a set of column-matrices, generating a set of degree-two tensors by processing a set of tensor-product matrices and a set of linear transform matrices, wherein each of the set of degree-two tensors corresponds to one of the set of column-matrices, generating a sequence of gadget-outputs by providing the degree-two tensors to the set of column matrices, and generating an output matrix of the said function by post-processing the sequence of gadget-outputs.

According to a further embodiment of the disclosure, processing a set of tensor-product matrices and a set of linear transform matrices includes calculating a set of matrices $T_{i,b,x}$ for i=1 to n, b=x[i]=0 or 1, x is the input bit-string, defined as $T_{i,b,x}=\Pi_{j=1,m}F_{i,b,j} \times (G_{i,j,z} \otimes H_{i,j,z}) \times F_{i,b,j+1}^{-1}$ is a $t^2 \times t^2$ matrix, t≥2 where F is one of the set of linear-transform matrices, $G_{i,j,z} \otimes H_{i,j,z}$ is one of the set of tensor-product matrices, and z=x[j].

According to a further embodiment of the disclosure, the sequence of gadget-outputs is a sequence of t×t matrices $S_{i,b}=\text{mat}\{_{i,b,1}^{-1} \times T_{i,b,x} \times F_{i,b,m+1} \times (F_{i,b,1}^{-1} \times T_{i,b,x} \times F_{i,b,m+1})^T \times \text{vec } C_{i,b}\}$. vec $C_{i,b}$ is one of the set of column-matrices, and $C_{i,b}$, is one of the subset of matrices of a matrix-product program.

According to a further embodiment of the disclosure, post-processing the sequence of gadget-outputs comprises generating the output matrix by multiplying the sequence of matrices $S_{i,b}$.

According to a further embodiment of the disclosure, post-processing the sequence of gadget-outputs comprises outputting TRUE if and only if an output matrix $W=\Pi_{i=1,n}S_{i,b}$ is not an identity matrix.

According to a further embodiment of the disclosure, the method includes outputting false when W is equal to an identity matrix.

According to an embodiment of the disclosure, there is provided a computer program product for compiling a matrix-product program into an obfuscated-matrix-product program comprising a non-transitory program storage device readable by a conputer, tangibly embodying a program of instructions executed by the computer to cause the computer to perform a method.

BRIEF DESCRIPTION OF THE DRAWINGS

FIG. 3 illustrates the vectorization of a matrix, according to an embodiment of the disclosure.

FIG. 4 illustrates the tensor-product of matrices, according to an embodiment of the disclosure.

FIG. 5 shows that a tensor product has a sandwich effect when multiplied to the right of a column (matrix), according to an embodiment of the disclosure.

FIG. 13 illustrates a degree 2 monomials in s variables, according to an embodiment of the disclosure.

DETAILED DESCRIPTION OF EXEMPLARY EMBODIMENTS

Figure 1:
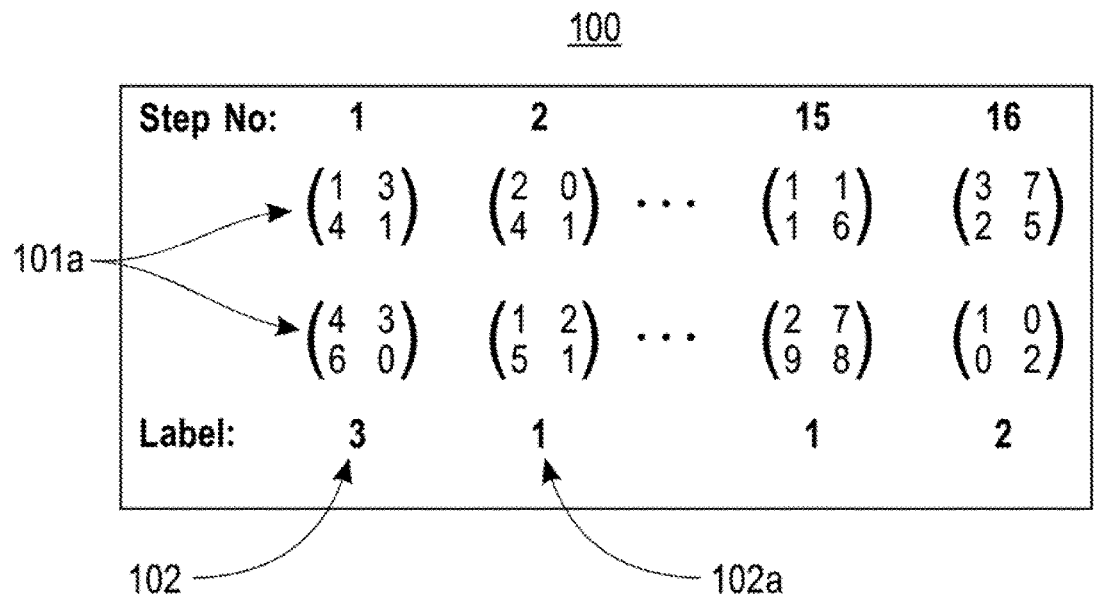
FIG. 1 illustrates an example of a matrix-product program according to an embodiment of the disclosure.

Exemplary embodiments of the disclosure as described herein generally provide methods and systems for transforming or compiling a computer program or circuit into an equivalent obfuscated version of the program or circuit. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

An embodiment of a method of obfuscating a circuit comprises the steps of converting the circuit into a matrix-product program known in the prior art as Barrington's theorem. Thereafter, the matrix product-program, which includes a collection of matrices, is obfuscated by providing obfuscated gadgets that allow one to choose and multiply a subset of these matrices without revealing the matrices themselves. Embodiments use a tensor-product of additional random and invertible matrices, which in turn are hidden using bigger linear transforms of such tensor-product of matrices.

According to embodiments, in more detail, each of the matrices in the original matrix-product program is embedded in an obfuscated gadget as part of a quadratic function of the input to the obfuscated gadget. The obfuscated gadget then unmasks the input of its linear transform, and if the resulting unmasked matrix is a tensor-product matrix, then it can be factored into two matrices. Next, the two factored matrices are multiplied by the obfuscated gadget into the left and right of the original matrix respectively. Embodiments provide a method of implementing such an obfuscated gadget while proving that general techniques of analyzing such gadgets do not work on this gadget, and hence the obfuscated gadget is secure.

Further embodiments of the disclosure teach how to use the obfuscated gadget to evaluate the original circuit on any given input. It is well known that any computer program can be converted into a circuit. Thus, embodiments of the disclosure can be used for obfuscating any program.

FIG. 1 illustrates an example of a matrix-product program according to an embodiment of the disclosure. It is known that any program can be translated into a matrix-product program. A matrix-product program of n steps, and m binary-inputs, and a one-bit output, includes of n pairs of integer matrices denoted ($C_{i,0}$, $C_{i,1}$) with i ranging from 1 to n. The matrix-product program also specifies a way to associate a single input-bit to each step. This association is done by a map called label, that maps numbers from 1 to n to numbers, from 1 to m. Thus, label(i) means that input bit number label(i) is associated with step i of the program. FIG. 1 illustrates such a program with 16 steps, n=16. The pairs of 2×2 matrices are shown as figure elements 101a. For each step 1, the top matrix is $C_{i,0}$ and the bottom matrix is $C_{i,1}$. The figure also shows the label mapping (102). This program has m=3 binary inputs, which are the labels 102a below the matrices. The $1^{st}$ step has input-bit number label (1)=3 (102a) associated with it, and similarly steps 2 and 15 have input-bits 1 associated with them, and step 16 has input-bit 2 associated with it.

Figure 2:
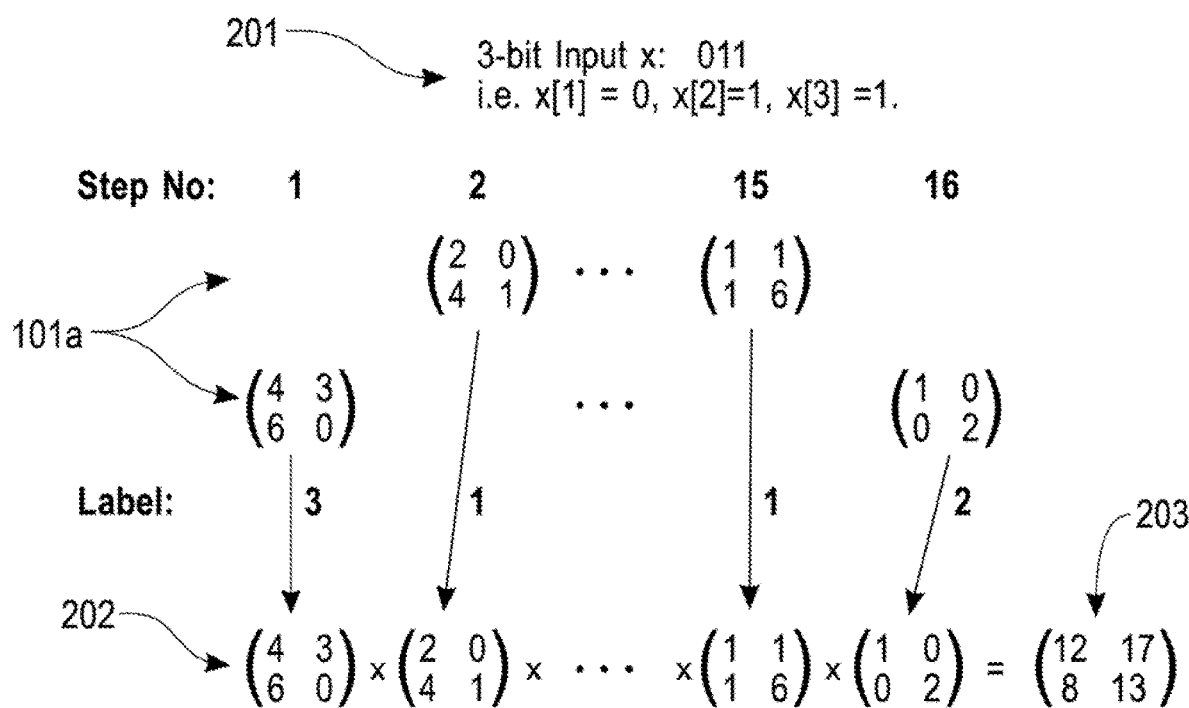
FIG. 2 illustrates an example of how a matrix-product program of FIG. 1 is executed, according to an embodiment of the disclosure.

While FIG. 1 illustrated a matrix-product program, according to an embodiment of the disclosure, FIG. 2 shows an example of how a matrix-product program of FIG. 1 is executed. The computation is on, a particular three bit input, shown here as binary input array x (201). The binary input is used to pick one matrix from each step. Thus, since label of step 1 is 3, the third input bit, i.e. x[3], is used, which happens to be 1, to select the bottom matrix for step 1, and ignore the top matrix. Similarly, for step 2, since label[2]=1, x[1] is used, which is 0, to pick the top matrix for step 2, and so forth Once a matrix is picked for each step, they are multiplied together in that order as shown in 202. The resulting product-matrix, as shown in 203, is checked to be equal to the identity matrix. If it is the identity matrix, the output of the matrix-product program on input x is FALSE else it is TRUE. For some matrix-product programs, the final product-matrix is checked whether it is a scalar multiple of the identity matrix, and if so the output is FALSE else TRUE. Matrix-product programs are known in the art.

Some notation needs to be introduced. FIG. 3 illustrates the vectorization of a matrix (301), according to an embodiment, of the disclosure. The vectorization operator, written as "vec M" for an m×n matrix M, produces a column vector of length n*m, by scanning the matrix in a row-wise fashion, as shown in 301. The reverse operation of reshaping a column into a matrix is simply denoted "mat". A matrix can also be vectorized by scanning it column-wise, but embodiments of the disclosure consider row-wise scanning.

FIG. 4 illustrates the tensor-product of matrices, according to an embodiment of the disclosure. The tensor product of two matrices A and B, denoted by the operator ⊗, where A is a r×s matrix and B is a t×u matrix, is a (r*t)×(s*u) matrix. An example is given in FIG. 4, which illustrates the tensor-product of a 2×2 matrix (401a) and another 2×2 matrix (401b). The result is a 4×4 matrix (403). Intermediate result 402 illustrates how the matrices A and B are multiplied. The tensor-product of matrices is also known as the Kronecker product. In addition, a tensor-product of column-matrices is also known as the outer-product of the columns.

According to an embodiment, FIG. 5 shows that a tensor product has a sandwich effect when multiplied to the right of a column (matrix). A well-known rule is described in equation 501, which states that (A⊗B)×vec M=vec(A×M×$B^T$). The tensor product of matrices A and B when multiplied on the right of a vectorization of a matrix M has the effect of simultaneously multiplying M on the left with A and on the right by transpose of B. An example of this rule or theorem is shown in 502. Note that the left most matrix in equation 501 is the tensor product of 2 by 2 matrices 401a and 401b shown in FIG. 4.

Figure 6:
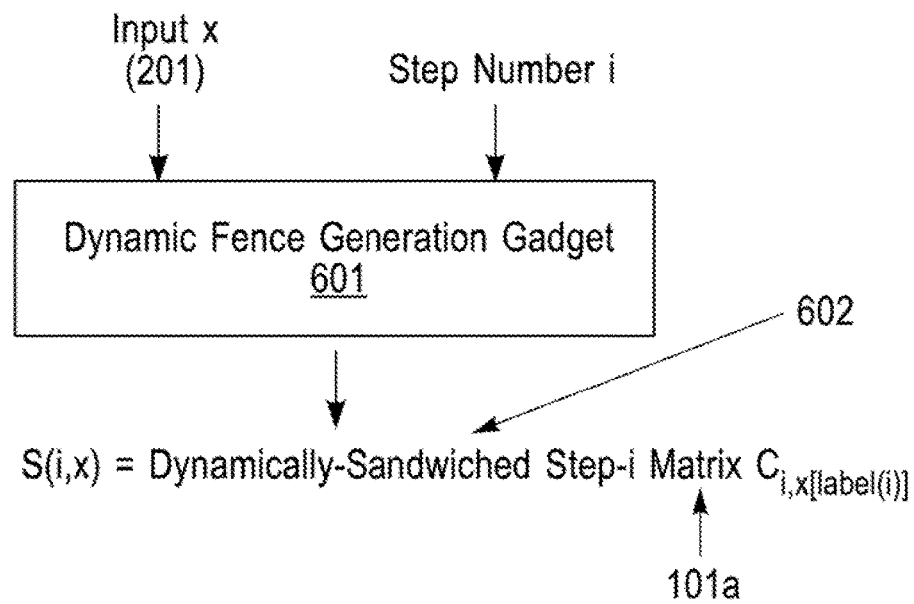
FIG. 6 illustrates the dynamic fencing of a matrix-product program according to an embodiment of the disclosure.

FIG. 6 illustrates the dynamic fencing of a matrix-product program according to an embodiment of the disclosure. A matrix-product program is obfuscated by using gadgets instead of the matrices ($C_{i,0}$, $C_{i,1}$) of the matrix-product program described in FIG. 1. According to an embodiment, a gadget can be any transformation, and in this context a mathematical transformation, with the implication is that it is being used in a bigger construction, often repeatedly and in different ways. The gadgets can then be used to compute the original program on a particular in-bit input. The gadgets by themselves do not reveal the original matrices ($C_{i,0}$, $C_{i,1}$) or any function of these other than what is revealed by actually computing the output on any input. The gadget 601 shown in FIG. 6 has the property that it takes an input x (as in 201) and a step number, say step number i, and produces a "dynamically-sandwiched" step i matrix S(i, x)= $C_{i, x[label[i]]}$ 602. Gadget 601 will be referred to hereinbelow as a dynamic-fence generation gadget. Recall, on input x, the i-th step uses input-bit label[i], and hence the matrix $C_{i, x[label[i]]}$. The gadget 601 produces a dynamically-sandwiched version of $C_{i, x[label[i]]}$. How this dynamic-sandwich effect is achieved is described below. In particular, how the S(i,x) matrices output by 601 are employed to compute the program on input x will be described below with reference to FIG. 12. According to an embodiment, the structure of gadget 601 will be described first, and it can be seen that the 101a matrices $C_{i, x[label[i]]}$ are embedded in the gadget 601.

Figure 7:
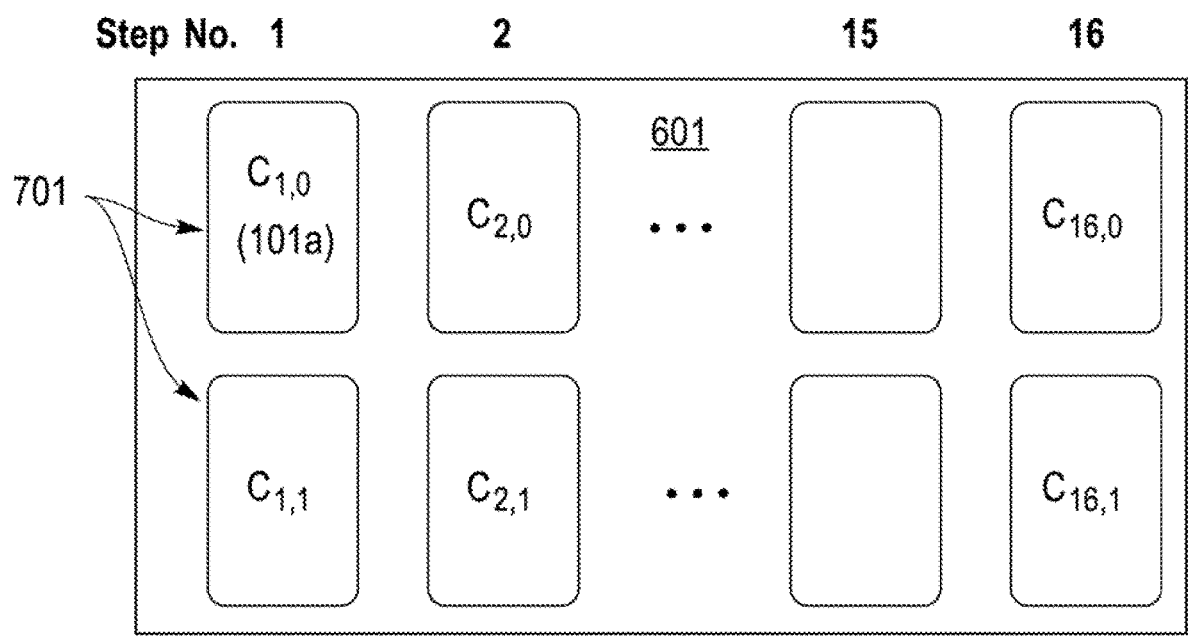
FIG. 7 shows the composition of a dynamic fence generation gadget of FIG. 6 according to an embodiment of the disclosure.

According to an embodiment, FIG. 7 shows the composition of a dynamic fence generation gadget of FIG. 6, and that gadget 601 of FIG. 6 is itself composed of 2*n step gadgets 701, with n=16, one corresponding to each matrix $C_{i, x[label[i]]}$ where b is either 0 or 1.

Figures 8, 9:
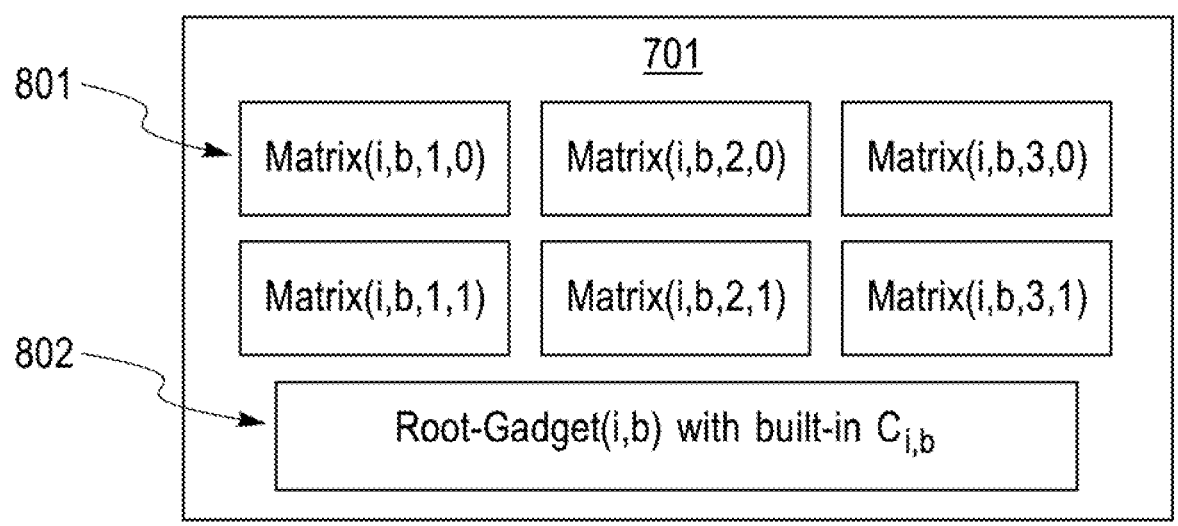
FIG. 8 illustrates the structure of a step gadget(i,b) of FIG. 7 for step i and step input bit b, according to an embodiment of the disclosure.
FIG. 9 illustrates a Matrix (i,b,j,z) of FIG. 8, according to an embodiment of the disclosure.

FIG. 8 the structure of a step gadget(i,b) 701 of FIG. 7 for step i and step input bit b, which will be referred to as Gadget(i,b), i.e. one corresponding, to $C_{i,b}$. This step gadget 701 is itself composed of one root-gadget 802, and a plurality of matrices 801. There are two matrices for each input-bit. Thus if there are m=3 input-bits then there are 6 matrices 801. The matrices will be referred to as Matrix(i, b,j,z), where) ranges over 1 m, and z is either zero or one.

FIG. 9 illustrates a matrix (801) Matrix(i,b,j,z)=$F_{i,b,j}$× ($G_{i,j,z}$⊗$H_{i,j,z}$)×$F_{i,b,j+1}^{-1}$, according to an embodiment of the disclosure. Matrix (801) is the product of three matrices X, Y, Z, each of which is a 4×4 matrix, where X=$F_{i,b,j}$, Y=$G_{i,j,z}$⊗$H_{i,j,z}$, and Z=$F_{i,b,j+1}^{-1}$. In general, there could by (t*t)×(t*t) matrices, for t>=2. For simplicity of explanation, according to an embodiment, the case of t=2, and hence 4×4 matrices, will be considered. However, embodiments are not limited thereto, and t can be greater than 2 in other embodiments. The matrix Y is itself a tensor product of two 2×2 matrices $G_{i,j,z}$ and $H_{i,j,z}$. Note from the description, Z in Matrix(i,b,j,z) is the inverse of the matrix X in Matrix(i,b, j+1,z), Matrices X and Z may be referred to herein as linear transform matrices. Moreover, both gadgets Matrix(i,b,j,0) and Matrix(i,b,j,1) use the same matrices X and Z, namely, $F_{i,b,j}$ and inverse of $F_{i,b,j+1}$ respectively. All these matrices are chosen by a program obfuscator according to an embodiment to be invertible matrices.

Figure 10:
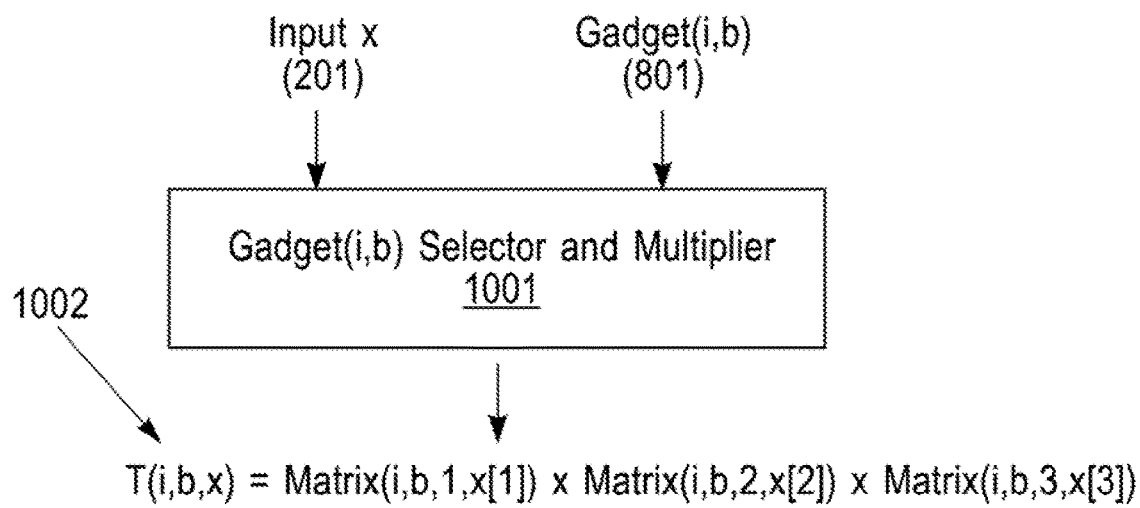
FIG. 10 illustrates the use of matrices (i,b,j,z) of FIG. 8 to build an input for a root gadget of FIG. 8, according to an embodiment of the disclosure.

Before describing the root-gadget (802) component of Gadget(i,b) (701), its input will be described. According to an embodiment, the input to a root-gadget comes from selecting a subset of matrices 801 and taking their product. A subset selector (1001) is described with reference to FIG. 10. FIG. 10 illustrates the use of matrices (i,b,j,z) of FIG. 8 to build an input for a root gadget of FIG. 8. Going back to FIG. 8, which shows the various component 801 matrices, the input x is again used to make this selection. If for input-bit number j, x[j] is zero then the top matrix is chosen, i.e. Matrix(i,b,j,0), otherwise the bottom matrix is chosen, i.e. Matrix(i,b,j,1). More succinctly, Matrix(i,b,j,x[j]) is chosen. Then these matrices are multiplied to produce matrix T(i,b,x), as shown in 1002. In general, T(i,b,x)=$\Pi_{j=1,m}$Matrix(i,b,j,x[j]), where b=x[label[i]]. This is then input to the root-gadget 802, as described next with FIG. 11.

Figure 11:
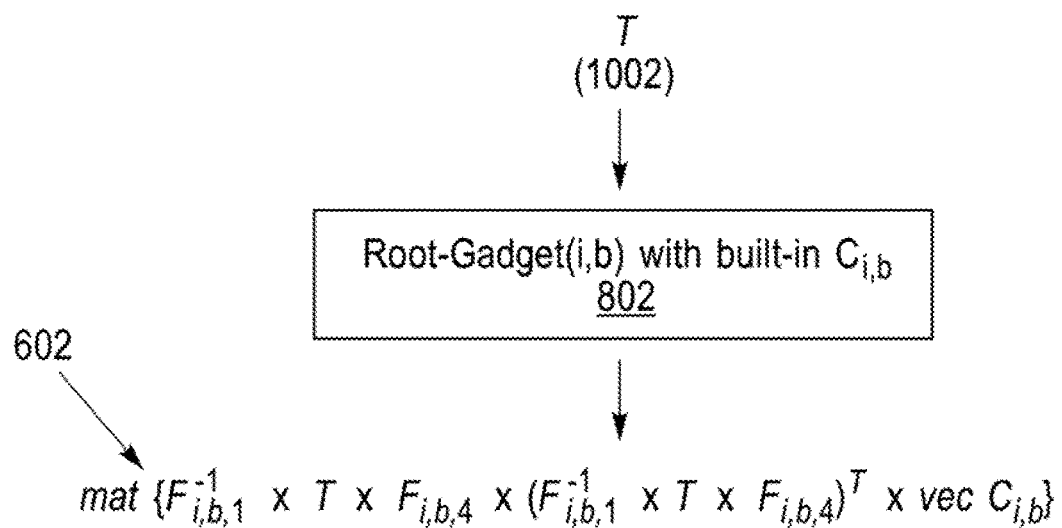
FIG. 11 shows how an input computed from the various matrices of FIG. 8 are processed by a root-gadget, according to an embodiment of the disclosure.

According to an embodiment, FIG. 11 shows how the input T(i,b,x) computed from the various matrices 801 using input x as shown in FIG. 10 is processed by Root-Gadget (i,b) 802. This root-gadget has built into it some function of $C_{i,b}$. First, the behavior of this root-gadget, i.e. It's input-output behavior, will be described by assuming $C_{i,b}$ is available in the clear. Root-gadget 802 first takes the input T(i,b,x) and multiplies it on the left by inverse of $F_{i,b,1}$ and on the right by $F_{i,b,3+1}$ (recall, the number of inputs m is 3) to get a matrix, say W. Then W is multiplied by its own transpose, compute $U=WW^T$. Next, U is multiplied into the vectorization of $C_{i,b}$. The resulting vector is re-shaped into a matrix and that is the output of the root-gadget. Thus, the output 602 of FIG. 6 for $C_{i,b}$ in the clear is $$S(i,x)=\text{mat}\{F_{i,b,1}^{-1}\times F_{i,b,4}\times (F_{i,b,1}^{-1}\times T(i,b,x)\times F_{i,b,4})^T\times \text{vec } C_{i,b}\}.$$

Note that how such a gadget is implemented in an obfuscated program has not been described, or in other words, how such a root-gadget as described in the paragraph is obfuscated. Of course, one naïve and insecure obfuscation implementation would be to give $C_{i,b}$, $F_{i,b,1}$, $F_{i,b,4}$ in the clear as part of the Root-Gadget(i,b). But, before describing secure implementations of the Root-Gadget(i,b), how the complete set of gadgets are used to actually process an input x is described with reference to FIG. 12.

Figure 12:
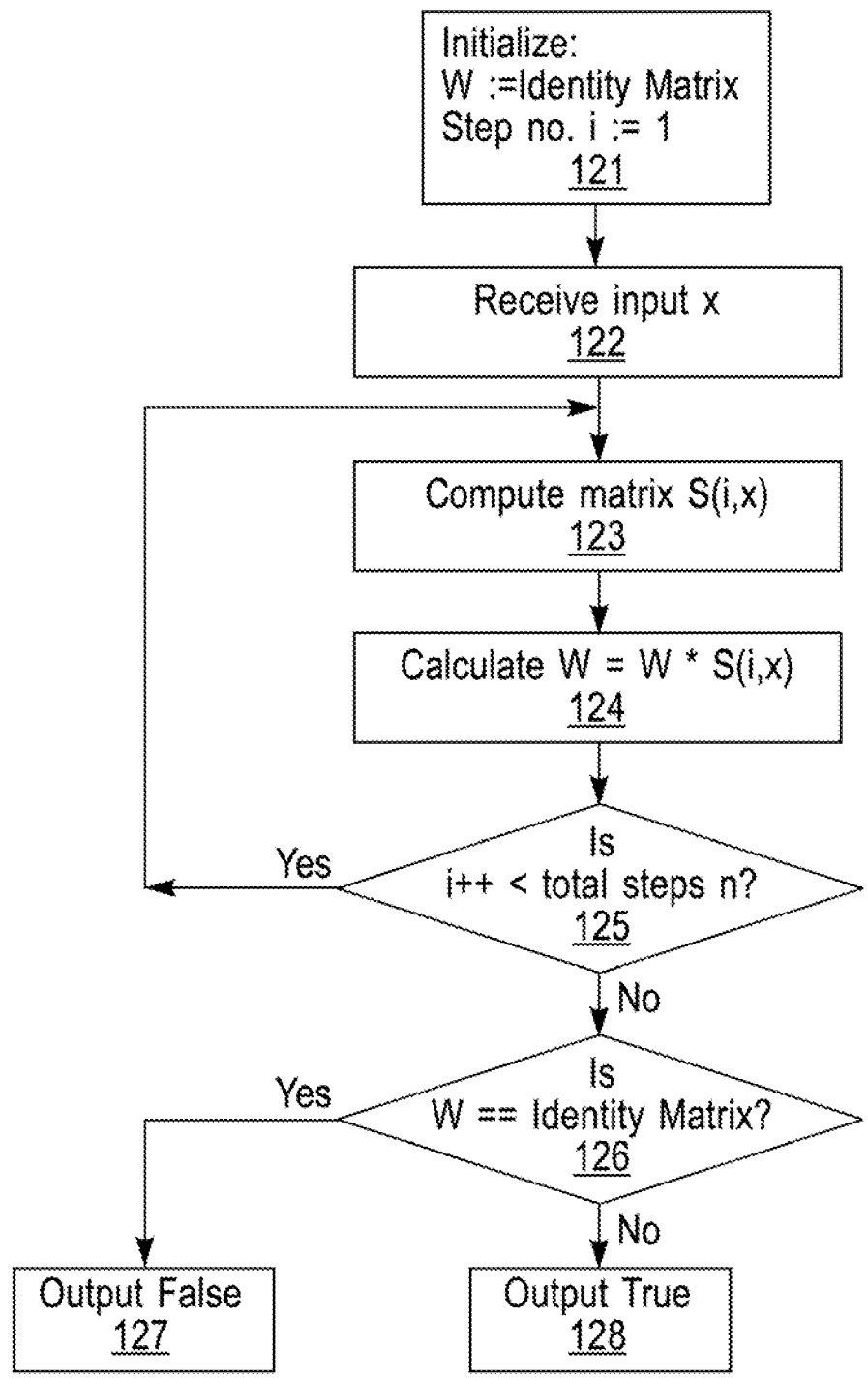
FIG. 12 is a flow-chart of executing an obfuscated branching program on a set of inputs, according to an embodiment of the disclosure.

FIG. 12 is a flow-chart of executing an obfuscated branching program on a set of inputs, using a dynamic-fence generation gadget (601) according to an embodiment to compute the output of the original matrix-product-program on an m-bit input x. A computation according to an embodiment begins at step 121 by initializing a matrix W to the identity matrix. In an example with t=2, this is a 2×2 identity matrix. The step number variable i is initialized to 1. The input x is received at step 122. Then, using the input x, and the step number i, the dynamic-fence generation gadget 601 is used at step 123 to compute matrix S(i,x) 602, as shown above in FIG. 11. W is then updated, at step 124 by multiplying it on the right by S(i,x). This process is iterated from step 125 by repeating steps 123 and 124 with the incremented step number i. Once all the steps are exhausted, the final matrix W is checked at step 126 to be the identity matrix. If so, the output is deemed to be FALSE at step 127, else TRUE at step 128. In some alternate embodiments, the check can be for a scalar matrix rather than identity matrix.

According to an embodiment, to describe how the root-gadget(i,b) is obfuscated, a concept of degree two monomials is introduced. This concept is known in mathematics. FIG. 13 illustrates a degree 2 monomials in s variables 1301. A tensor-product of this vector of variables, as described in FIG. 4, can be taken to obtain a vector of degree two monomials in x 1302. However, this tensor-product column has many repetitions. Thus, $\text{Mon}^2(x)$ 1303 represents this tensor-product of x with itself but with repetitions removed. It can be seen that for a vector $\vec{x}$ of s variables, $\text{Mon}^2(\vec{x})$ is of size s*(s+1)/2.

Figure 14:
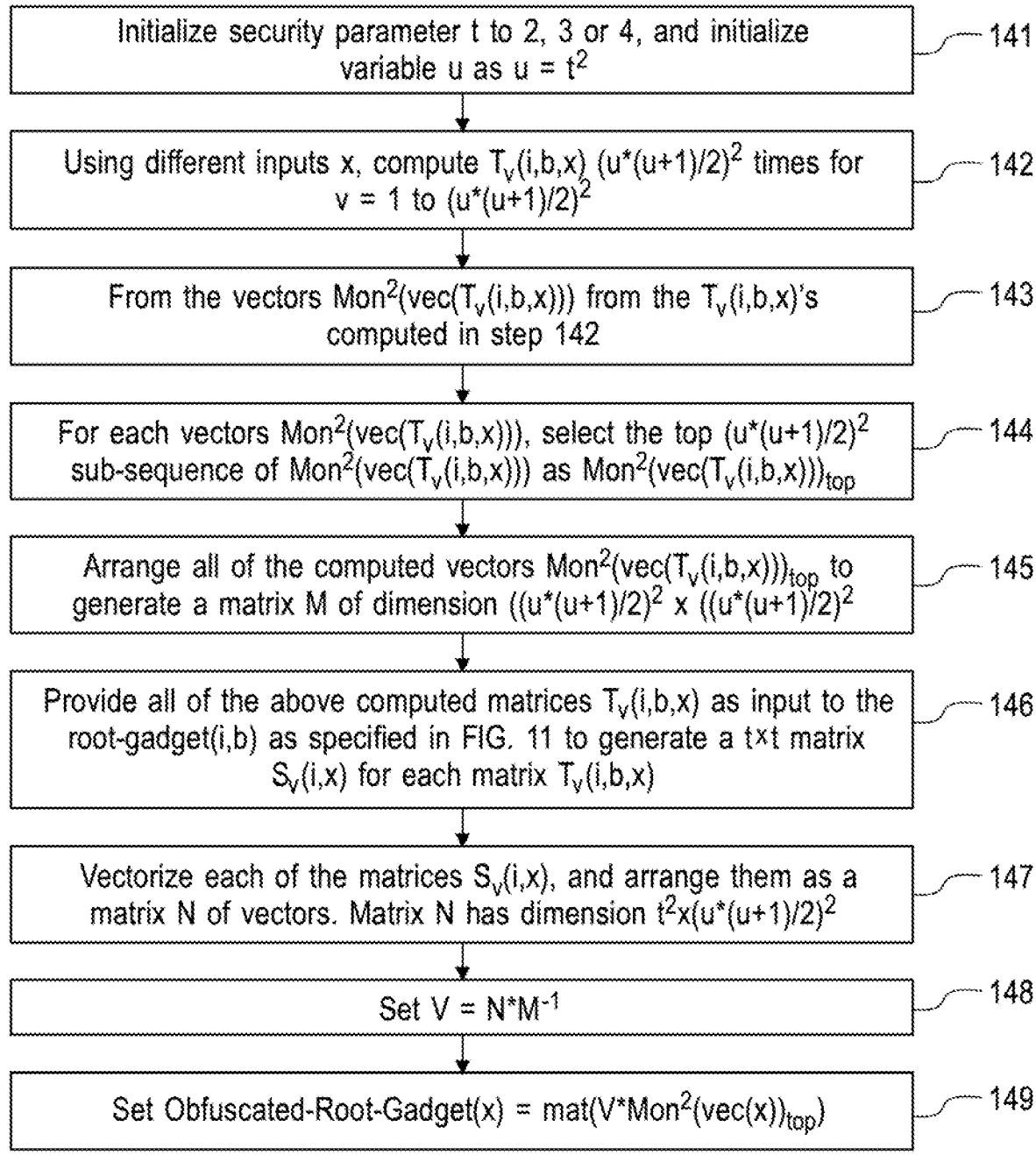
FIG. 14 presents pseudo-code for a procedure to obfuscate a root-gadget, according to an embodiment of the disclosure.

FIG. 14 presents pseudo-code for a procedure to obfuscate the root-Gadget(i,b), according to an embodiment of the disclosure. In step 141, a security parameter t is initialized, and variable u is initialized as $u=t^2$. The larger t is, the more secure the scheme. According to embodiments, t can be 2, 3, or 4. In step 142, compute $T_v(i,b,x)$ for v=1 to $(u*(u+1)/2)^2$ using different inputs x. Each $T_v(i,b,x)$ is a u×u matrix. At step 143, form the vector $\text{Mon}^2(\text{vec}(T_v(i,b,x)))$ for each of the $T_v(i,b,x)$'s computed in step 2. Note that each $\text{vec}(T_v(i,b,x))$ has length $u^2$, and thus $\text{Mon}^2(\text{vec}(T_v(i,b,x)))$ has size s*(s+1)/2, where $s=u^2$. At step 144, select the top $(u*(u+1)/2)^2$ sub-sequence of each $\text{Mon}^2(\text{vec}(T_v(i,b,x)))$ as $\text{Mon}^2(\text{vec}(T_v(i,b,x)))_{top}$. All of the computed vectors $\text{Mon}^2(\text{vec}(T_v(i,b,x)))_{top}$ are arranged in a matrix at step 145, to generate a matrix M of dimension $((u*(u+1)/2)^2)\times((u*(u+1)/2)^2)$. At step 146, all of the above computed matrices $T_v(i,b,x)$ are provided as input to the root-gadget(i,b) as specified in FIG. 11 to generate a txt matrix $S_v(i,x)$ for each matrix $T_v(i,b,x)$. Note that each root-gadget(i,b) incorporates a matrix $C_{i,b}$ of the original matrix product program. Each of the matrices $S_v(i,x)$ is vectorized at step 147, and arranged as a matrix N of vectors. Matrix N has dimension $t^2\times(u*(u+1)/2)^2$. Set $V=N*M^{-1}$ at step 148. At step 149, Obfuscated-Root-Gadget(x)=$\text{mat}(V*\text{Mon}^2(\text{vec}(x))_{top})$, for an arbitrary new input x. Recall that the root-gadget takes as input a matrix T. The obfuscated-root-gadget also takes the same input T and it's output is exactly the same as output of root-gadget 802 on inputs 1002 produced by the gadget and, selector 1001 shown in FIG. 10.

In an alternative embodiment, matrix M is not invertible as required in step 10 to compute V. However, it is well known that there will be one sub-sequence of size $(u*(u+1)/2)^2$ of $\text{Mon}^2(T(i,b,x))$ such that the resulting matrix M is invertible and there exists an efficient procedure to find this sub-sequence to get M. Then, the "top" subscript in the expression Obfuscated-Root-Gadget(T)=$\text{mat}(V*\text{Mon}^2(\text{vec}(T))_{top})$ would also be the same sub-sequence as used to get the invertible M.

Figure 15:
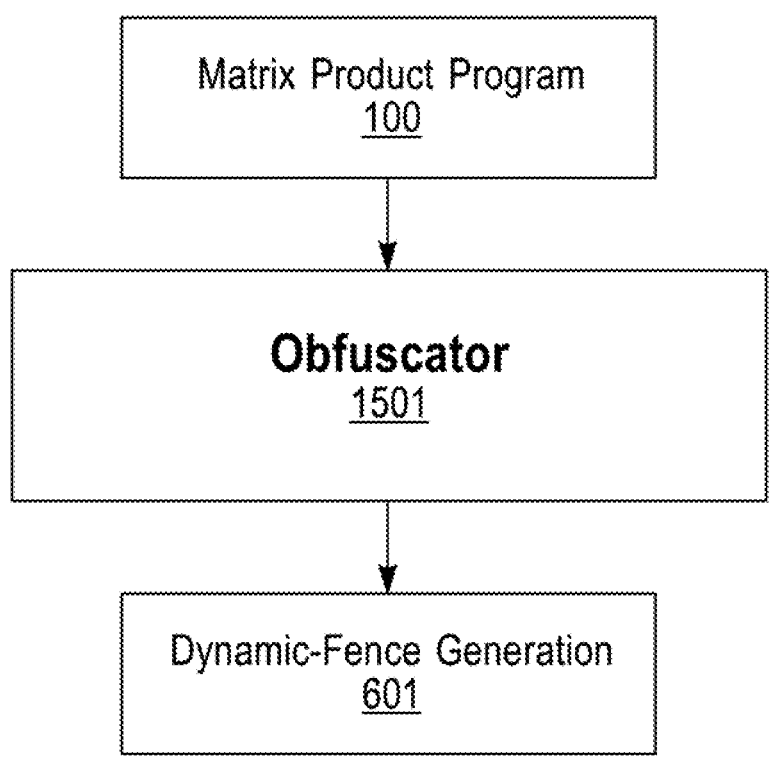
FIG. 15 illustrates an obfuscator that takes a matrix-product program P and outputs a sandwiched tensor product for P.

According to an embodiment, FIG. 15 illustrates an obfuscator, i.e., a procedure or software or automated-compiler that takes a matrix-product program P 100 and outputs a sandwiched tensor product (601) for P. The matrix-product program P 100 is the collection of matrices $C_{i,b}$ that make up the original matrix product program of FIGS. 1 and 2. The obfuscator 1501 is the compiler that generates dynamic-fence-generation gadget 601. In particular, the obfuscator 1501 randomly generates the independent and invertible sxs matrix F and independent and invertible txt matrices G and H used in Matrix(i,b,j,z) in FIGS. 8-9 and 11. Dynamic-fence-generation gadget 601 does not operate on the original matrix product program but is rather built by obfuscator 1501 using the original matrix product programs as described in FIGS. 6-11. As shown in FIG. 12, this dynamic-fence-generation gadget serves the purpose of the obfuscated program. The components of gadget 601 have already described with reference to FIGS. 6-9 and FIG. 14. Thus, the obfuscator 1501 takes its input, i.e. the matrix-product program, and generates the dynamic-fence generation gadget 601 as described in FIGS. 6-9 and FIG. 14.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 16:
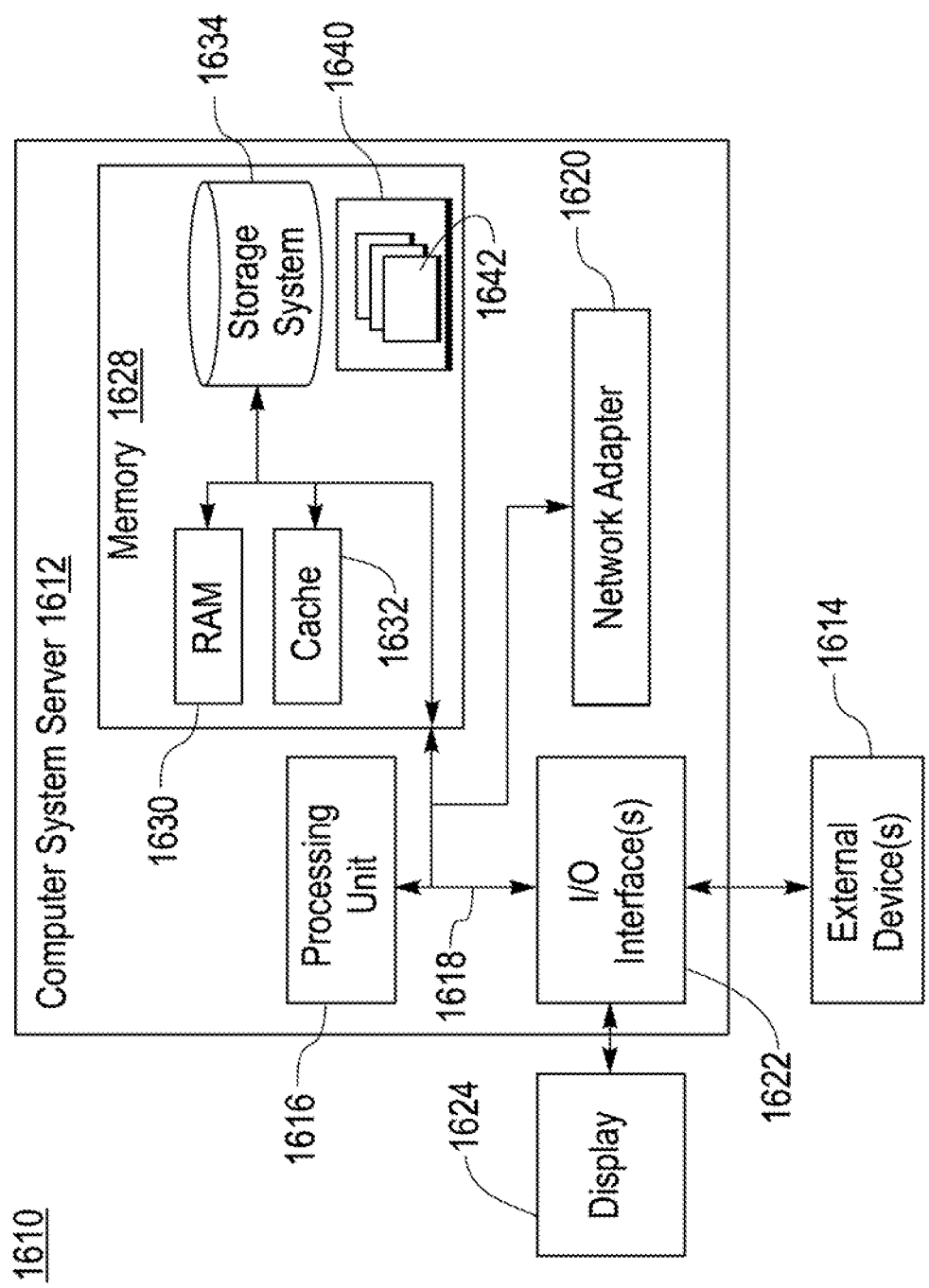
FIG. 16 is a schematic of an exemplary cloud computing node that implements an embodiment of the disclosure.

Referring now to FIG. 16, a schematic of an example of a cloud computing node is shown. Cloud computing node 1610 is only one example of a suitable cloud computing node and is not intended to suggest any limitation as to the scope of use or functionality of embodiments of the disclosure described herein. Regardless, cloud computing node 1610 is capable of being implemented and/or performing any of the functionality set forth hereinabove.

In cloud computing node 1610 there is a computer system/server 1612, which is operational with numerous other general purpose or special purpose computing system environments of configurations. Examples of well-known computing systems, environments, and/or configurations that may be suitable for use with computer system/server 1612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1612 may be practiced in distributed cloud computing environments where tasks are performed by remote processing devices that are linked through a communications network. In a distributed cloud computing, environment, program modules may be located in both local and remote computer system storage media including memory storage devices.

As shown in FIG. 16, computer system/server 1612 in cloud computing node 1610 is shown in the form of a general-purpose computing device. The components of computer system/server 1612 may include, but are not limited to, one or more processors or processing units 1616, a system memory 1628, and a bus 1618 that couples various system components including system memory 1628 to processor 1616.

Bus 1618 represents one or more of any of several types of bus structures, including a memory bus or memory controller, a peripheral bus, an accelerated graphics port, and a processor or local bus using an) of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1612 typically includes a variety of computer system readable media. Such media may be any available media that is accessible by computer system/server 1612, and it includes both volatile and non-volatile media, removable and non-removable media.

System memory 1628 can include computer system readable media in the form of volatile memory, such as random access memory (RAM) 1630 and/or cache memory 1632. Computer system/server 1612 may further include other removable/non-removable, volatile/non-volatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1618 by one or more data media interfaces. As will be further depicted and described below, memory 1628 may include at least one program product having a set (e.g., at least one) of program modules that are configured to carry out the functions of embodiments of the disclosure.

Program/utility 1640, having a set (at least one) of program modules 1642, may be stored in memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the disclosure as described herein.

Computer system/server 1612 may also communicate with one or more external devices 1614 such as a keyboard, a pointing device, a display 1624, etc.; one or more devices that enable a user to interact with computer system/server 1612; and/or any devices (e.g., network card, modem, etc.) that enable computer system/server 1612 to communicate with one or more other computing devices. Such communication can occur via Input/Output (I/O) interfaces 1622. Still yet, computer system/server 1612 can communicate with one or more networks such as a local area network (LAN), a general wide area network (WAN), and/or a public network (e.g., the Internet) via network adapter 1620. As depicted, network adapter 1620 communicates with the other components of computer system/server 1612 via, bus 1618. It should be understood that although not shown, other hardware and/or software components could be used in conjunction with computer system/server 1612. Examples, include, hut are not limited to: microcode, device drivers, redundant processing units, external disk drive arrays, RAID systems, tape drives, and data archival storage systems, etc.

Figure 17:
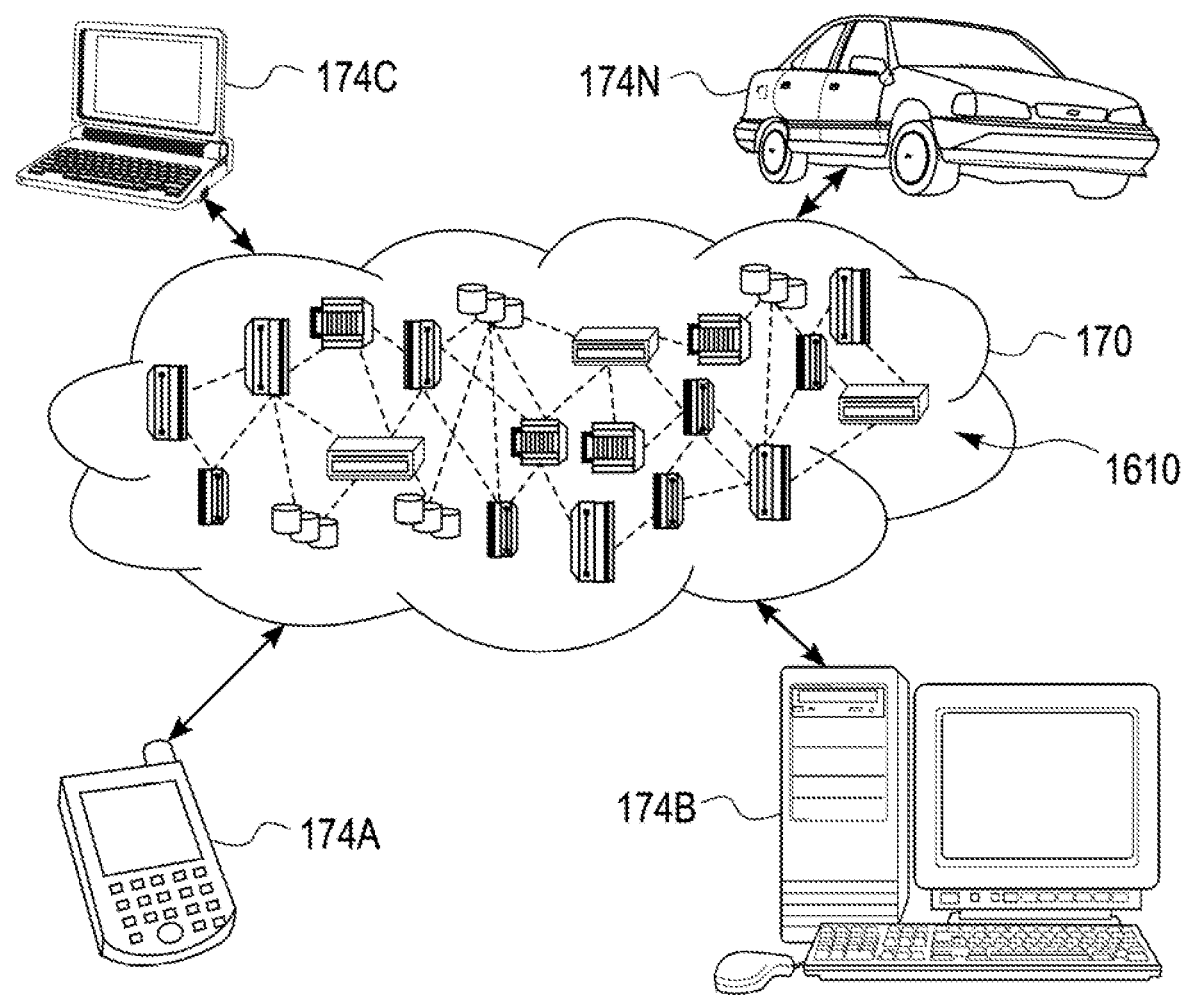
FIG. 17 shows an exemplary cloud computing environment, according to embodiments of the disclosure.

Referring now to FIG. 17, an illustrative cloud computing environment 170 is depicted. As shown, cloud computing environment u0 comprises one or more cloud computing nodes 1610 with which local computing devices used by cloud consumers, such as, for example, personal digital assistant (PDA) or cellular telephone 174A, desktop computer 174B, laptop computer 174C, and/or automobile computer system 174N may communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 170 to offer infrastructure, platforms and/or software as services for which a cloud consumer does not need to maintain resources on a local computing device. It is understood that the types of computing devices 174A-N shown in FIG. 17 are intended to be illustrative only and that computing nodes 1610 and cloud computing environment 170 can communicate with any type of computerized device over any type of network and/or network addressable connection e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for compiling a matrix-product program into an obfuscated-matrix-product program, the method comprising:
   receiving a plurality of matrices that form the matrix-product program;
   randomly generating a set of independent and invertible tensor-product matrices;
   randomly generating a set of independent and invertible linear-transform matrices; and
   generating a dynamic-fence-generation gadget by processing at least one of the plurality of matrices, the set of tensor-product matrices and the set of linear-transform matrices, wherein the dynamic-fence-generation gadget comprises a plurality of step-gadgets wherein each of the plurality of matrices is associated with one of the plurality of step-gadgets,
   wherein the dynamic-fence-generation gadget is an obfuscated version of computer program represented by the plurality of matrices,
   wherein each of the plurality of step gadgets is a matrix $S_{i,b}$ defined as
   $S_{i,b} = \mathrm{mat}\{F_{i,b,1}^{-1} \times T_{i,b,x} \times F_{i,b,m+1} \times (F_{i,b,1}^{-1} \times T_{i,b,x} \times F_{i,b,m+1})^T \times \mathrm{vec}\, C_{i,b}\}$, wherein
   $i=1$ to $n$, $m<n$, $b=0$ or $1$, $S_{i,b}$ is a t×t matrix, $t \geq 2$,
   C is one of the plurality of matrices that form the matrix-product program,
   F is one of the set of linear-transform matrices, $T_{i,b,x} = \Pi_{j=1,m} F_{i,b,j} \times (G_{i,j,z} \otimes H_{i,j,z}) \times F_{i,b,j+1}^{-1}$ is a $t^2 \times t^2$ matrix, $G_{i,j,z} \otimes H_{i,j,z}$ is one of the set of tensor-product matrices, and $z=x[j]$ wherein x is an input bit string of length m, wherein $x[j]=0$ or 1 for $j=1$ to m.

2. The method of claim 1, wherein each of the tensor-product matrices are over a finite field.

3. The method of claim 1, wherein each of the tensor-product matrices are over integers modulo a prime number.

4. The method of claim 1, wherein processing the at least one of the plurality of matrices comprises a plurality of processing sub-steps wherein each sub-step processes one of the plurality of matrices to produce said step-gadget.

5. The method of claim 4, further comprising:
computing a plurality of matrices $T_{i,b,x}$ for different inputs x and a matrix $S_{i,b}$ for each of the plurality of matrices $T_{i,b,x}$;
generating a matrix M from a sub-sequence of $Mon^2(vec(T_{i,b,x}))$ for each of the plurality of matrices $T_{i,b,x}$;
generating a matrix N by vectorizing each matrix $S_{i,b}$ and forming a matrix from the vectors $vec(S_{i,b})$; and
generating an obfuscated program $OP=mat\{V*Mon^2(vec(X))_{top}\}$, wherein $V=N*M^{-1}$ and $Mon^2(vec(X))_{top}$ is a top sub-sequence of $Mon^2(vec(X))$, wherein X is a new variable and OP is an obfuscation of a program represented by X.

6. The method of claim 1, wherein generating a dynamic-fence-generation gadget further comprises combining the set of linear-transform matrices and the set of tensor-product matrices.

7. The method of claim 6, wherein combining comprises:
selecting one of the set of tensor-product matrices and one of the set of linear-transform matrices; and
applying the selected linear-transform matrix to a vectorization of the selected tensor-product matrix.

8. A method for executing an obfuscated-matrix product program on an input bit string, the method comprising the steps of:
receiving an input bit-string;
selecting a subset of a set of matrices of a matrix-product program using at least one bit of the input bit-string;
processing the subset of matrices into a set of column-matrices;
generating a set of degree-two tensors by processing a set of tensor-product matrices and a set of linear transform matrices, wherein each of the set of degree-two tensors corresponds to one of the set of column-matrices;
generating a sequence of gadget-outputs by providing the degree-two tensors to the set of column matrices; and
generating an output matrix by post-processing the sequence of gadget-outputs,
wherein the step of processing a set of tensor-product matrices and a set of linear transform matrices comprises:
calculating a set of matrices $T_{i,b,x}$ for i=1 to n, b=x[i]=0 or 1, x is the input bit-string, defined as
$T_{i,b,x} = \Pi_{j=1,m} F_{i,b,j} \times (G_{i,j,z} \otimes H_{i,j,z}) \times F_{i,b,j+1}^{-1}$ is a $t^2 \times t^2$ matrix, $t \geq 2$,
wherein
F is one of the set of linear-transform matrices,
$G_{i,j,z} \otimes H_{i,j,z}$ is one of the set of tensor-product matrices, and $z=x[j]$,
wherein the sequence of gadget-outputs is a sequence of $t \times t$ matrices $S_{i,b} = mat\{F_{i,b,1}^{-1} \times T_{i,b,x} \times F_{i,b,m+1} \times (F_{i,b,1}^{-1} \times T_{i,b,x} \times F_{i,b,m+1})^T \times vec\ C_{i,b}\}$, wherein $vec\ C_{i,b}$ is one of the set of column-matrices, and $C_{i,b}$ is one of the subset of matrices of a matrix-product program,
wherein the sequence of gadget-outputs is an obfuscated version of the matrix product program.

9. The method of claim 8, wherein post-processing the sequence of gadget-outputs comprises generating the output matrix by multiplying the sequence of matrices $S_{i,b}$.

10. The method of claim 9, wherein post-processing the sequence of gadget-outputs comprises outputting TRUE if and only if an output matrix $W=\Pi_{i=1,n} S_{i,b}$ is not an identity matrix.

11. The method of claim 10, further comprising outputting false when W is equal to an identity matrix.

12. A computer program product for compiling a matrix-product program into an obfuscated-matrix-product program comprising a non-transitory program storage device readable by a computer, tangibly embodying a program of instructions executed by the computer to cause the computer to perform a method comprising the steps of:
receiving a plurality of matrices that form the matrix-product program;
randomly generating a set of independent and invertible tensor-product matrices;
randomly generating a set of independent and invertible linear-transform matrices; and
generating a dynamic-fence-generation gadget by processing at least one of the plurality of matrices, the set of tensor-product matrices and the set of linear-transform matrices, wherein the dynamic-fence-generation gadget comprises a plurality of step-gadgets wherein each of the plurality of matrices is associated with one of the plurality of step-gadgets,
wherein the dynamic-fence-generation gadget is an obfuscated version of computer program represented by the plurality of matrices,
wherein each of the plurality of step gadgets is a matrix $S_{i,b}$ defined as
$S_{i,b} = mat\{F_{i,b,1}^{-1} \times T_{i,b,x} \times F_{i,b,m+1} \times (F_{i,b,1}^{-1} \times T_{i,b,x} \times F_{i,b,m+1})^T \times vec\ C_{i,b}\}$, wherein
i=1 to n, m<n, b=0 or 1, $S_{i,b}$ is a t×t matrix, $t \geq 2$,
C is one of the plurality of matrices that form the matrix-product program,
F is one of the set of linear-transform matrices,
$T_{i,b,x} = \Pi_{j=1,m} F_{i,b,j} \times (G_{i,j,z} \otimes H_{i,j,z}) \times F_{i,b,j+1}^{-1}$ is a $t^2 \times t^2$ matrix,
$G_{i,j,z} \otimes H_{i,j,z}$ is one of the set of tensor-product matrices, and
$z=x[j]$ wherein x is an input bit string of length m, wherein $x[j]=0$ or 1 for $j=1$ to m.

13. The computer program product of claim 12,
wherein processing the at least one of the plurality of matrices comprises a plurality of processing sub-steps wherein each sub-step processes one of the plurality of matrices to produce said step-gadget,
wherein the step-gadget is a quadratic function of its input and embedded within the quadratic function is the one of the plurality of matrices.

14. The computer program product of claim 13, wherein the method further comprises:
computing a plurality of matrices $T_{i,b,x}$ for different inputs x and a matrix $S_{i,b}$ for each of the plurality of matrices $T_{i,b,x}$;
generating a matrix M from a sub-sequence of $Mon^2(vec(T_{i,b,x}))$ for each of the plurality of matrices $T_{i,b,x}$;
generating a matrix N by vectorizing each matrix $S_{i,b}$ and forming a matrix from the vectors $vec(S_{i,b})$; and generating an obfuscated program OP=mat{V*Mon²(vec(X))$_{top}$}, wherein V=N*M$^{-1}$ and Mon²(vec(X))$_{top}$, is a top sub-sequence of Mon²(vec(X)), wherein X is a new variable and OP is an obfuscation of a program represented by X.

* * * * *